United States Patent

[11] 3,547,313

[72] Inventors Irving Pitel
Metuchen;
Floyd C. Cornine, Red Bank; Richard S. Silverman, Union; Arnold B. Cohen, North Plainfield, N.J.
[21] Appl. No. 733,665
[22] Filed May 31, 1968
[45] Patented Dec. 15, 1970
[73] Assignee Automatic Merchandising Machine Mfg. Corporation
Avenel, N.J.
a corporation of New Jersey

[54] ARTICLE-DISPENSING MACHINE
16 Claims, 13 Drawing Figs.
[52] U.S. Cl. .................................................. 221/78
[51] Int. Cl. .................................................. G07f 11/00
[50] Field of Search .................................................. 221/110, 113, 80, 85, 106, 81, 78, 89, 6, 91

[56] References Cited
UNITED STATES PATENTS
3,130,859 4/1964 Vermeer ..................... 221/78
3,294,286 12/1966 Zibbell ........................ 221/6

Primary Examiner—Stanley H. Tollberg
Attorney—Sommers & Sommers

ABSTRACT: In a machine for the sequential dispensing of articles from vending units, each vending unit being comprised of a series of horizontal article-supporting shelves conveyed in vertically spaced arrangement about an inner wall of the unit, sequentially dispensing the articles by moving them off the shelves as the shelves descend.

PATENTED DEC 15 1970

INVENTORS
I. PITEL
F. C. CORNINE
R. S. SILVERMAN
A. B. COHEN

BY *Sommers & Sommers*

ATTORNEYS

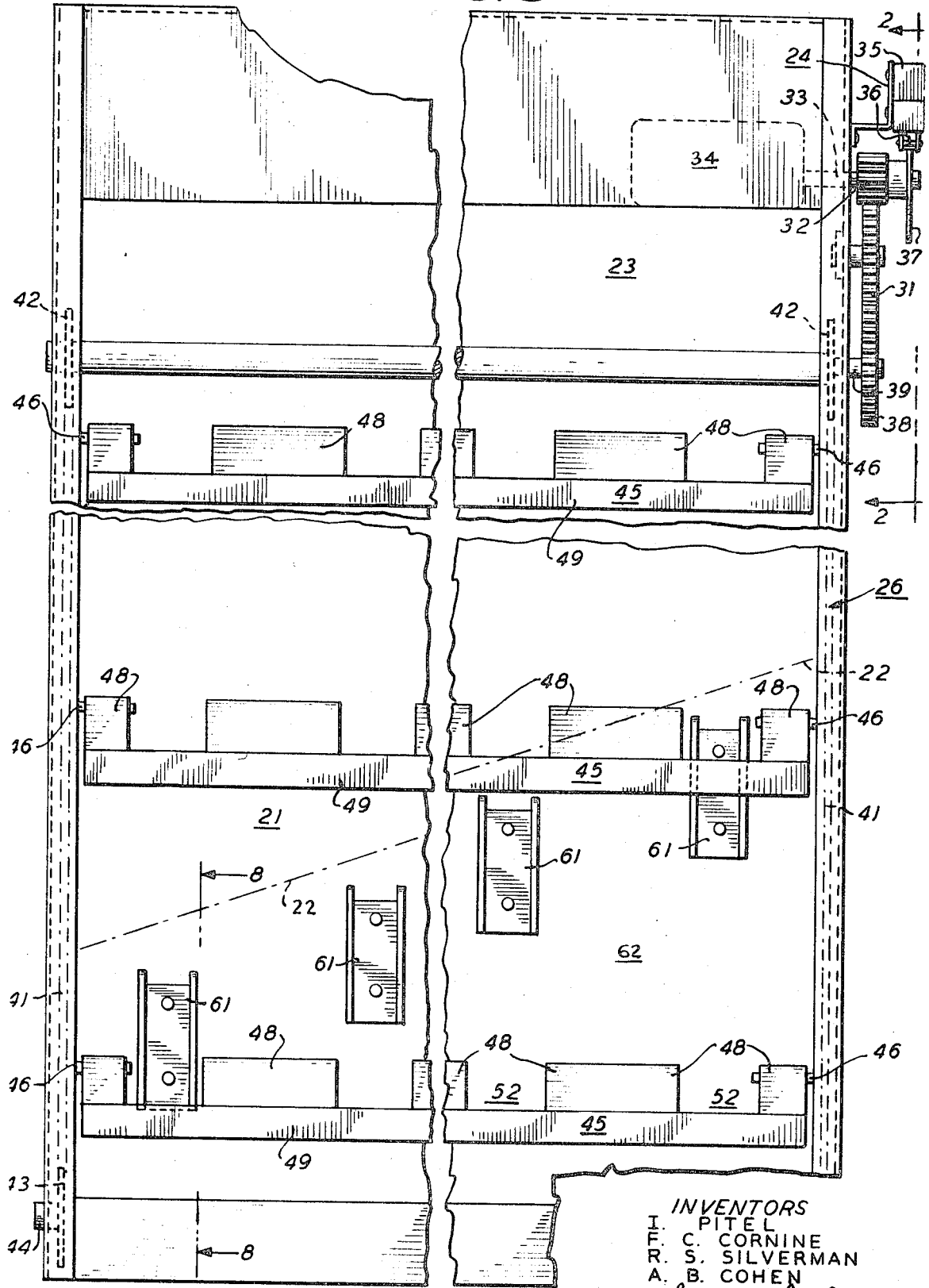

3,547,313
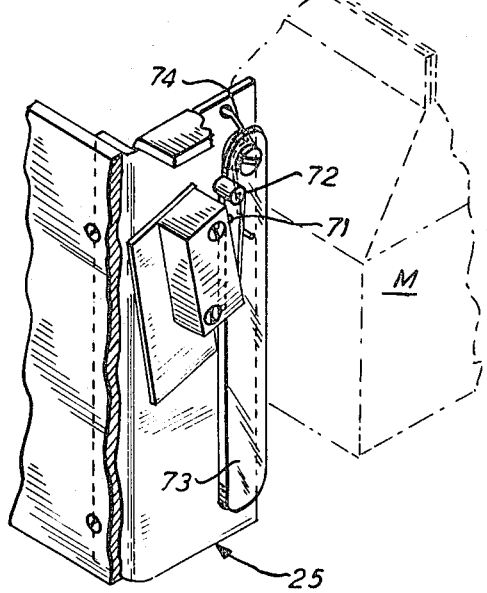
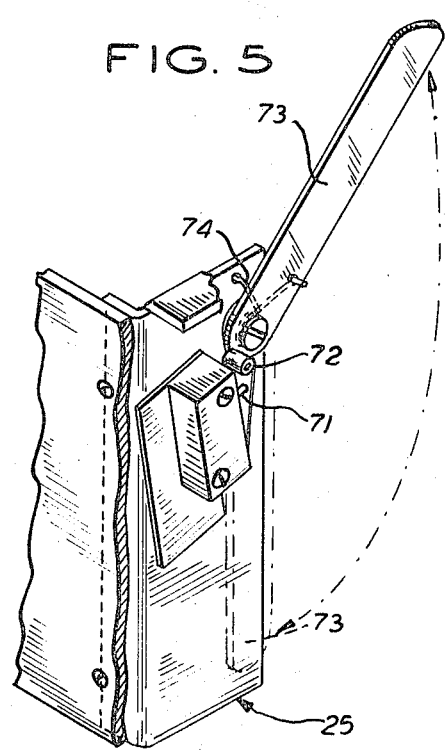
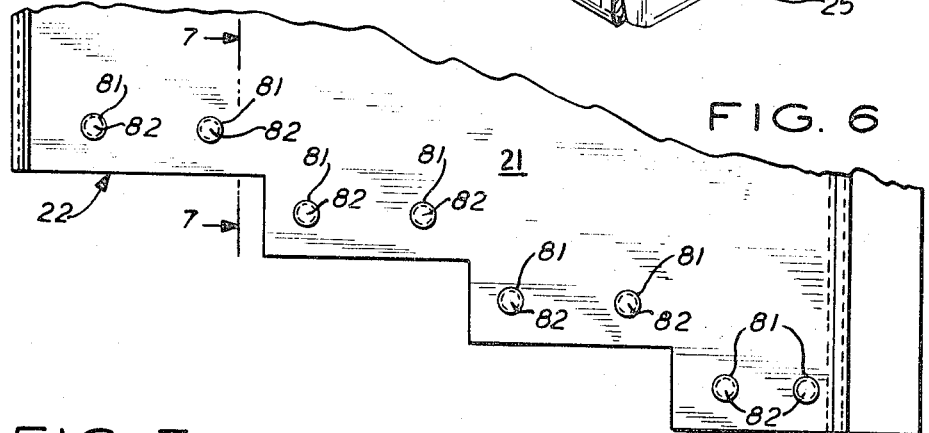
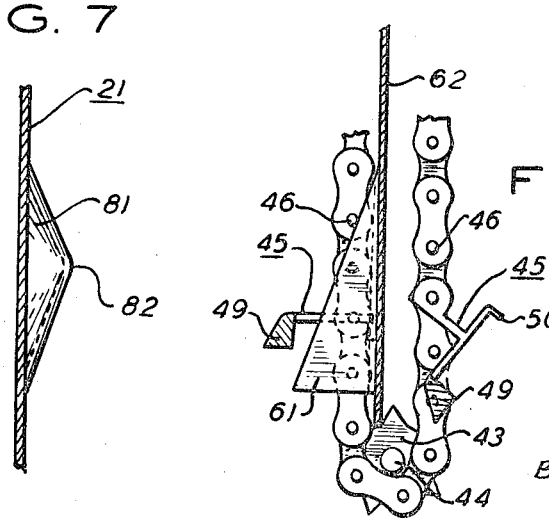
INVENTORS
I. PITEL
F. C. CORNINE
R. S. SILVERMAN
A. B. COHEN
BY Sommers & Sommers
ATTORNEYS

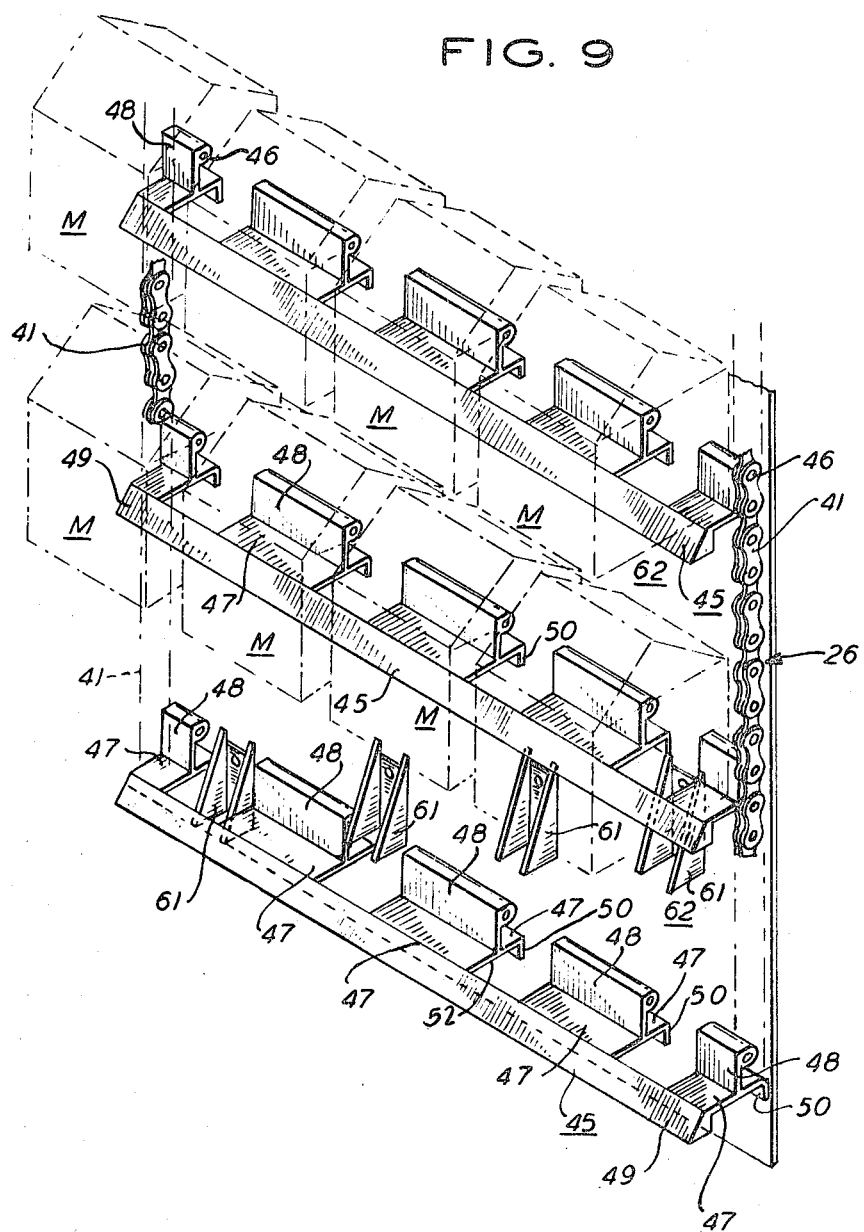

PATENTED DEC 15 1970

INVENTORS
I. PITEL
F. C. CORNINE
R. S. SILVERMAN
A. B. COHEN

BY Sommers & Sommers
ATTORNEYS

ARTICLE-DISPENSING MACHINE

ARTICLE-DISPENSING MACHINE

This invention relates to the dispensing of cartons, and more particularly cartons arranged in plural numbers.

Pursuant to the invention, the vending machine may be readily stocked in simple fashion, with a plurality of cartons to be vended arranged therein in side by side relation on rows of shelves, and with novel dispensing means, such as to automatically serially and selectively displace the cartons from the shelves in a simple and accurate fashion, for delivery to the operator of the machine.

Devices proposed for this purpose heretofore have generally been objectionable due to their complexity and high cost of initial manufacture and requirement for substantial maintenance. Further, such devices utilized several movable and other parts which were inefficient in operation and which presented surfaces for the accumulation of waste materials in the machine operating area, seriously endangering health and safety due to accumulations of waste in the foodstuffs and on the container surfaces thereof, and often interrupting the dispensing operation of the machine by catching and cutting into the article to be dispensed. These objections in devices heretofore proposed have been eliminated in the vending machine of this invention which is rugged and durable in use.

In the drawings, wherein similar reference characters indicate like parts:

FIG. 3 is a partly fragmentary, vertical elevational view, taken on line 3–3 of FIG. 1;

FIG. 4 is a perspective, partly broken view, of an empty switch pursuant to the invention, shown held by a carton in inoperative position;

FIG. 5 is a similar view showing the switch actuated following complete dispensing of all articles from the until;

FIG. 6 is a front partly broken, elevational view of an inner wall of the device embodying the invention;

FIG. 7 is an enlarged sectional view, taken on line 7–7 of FIG. 6;

FIG. 8 is a fragmentary elevational, partly sectional view, taken on line 8–8 of FIG. 3;

FIG. 9 is a partly fragmentary perspective front view of a vending unit embodying the invention;

Figure 1:
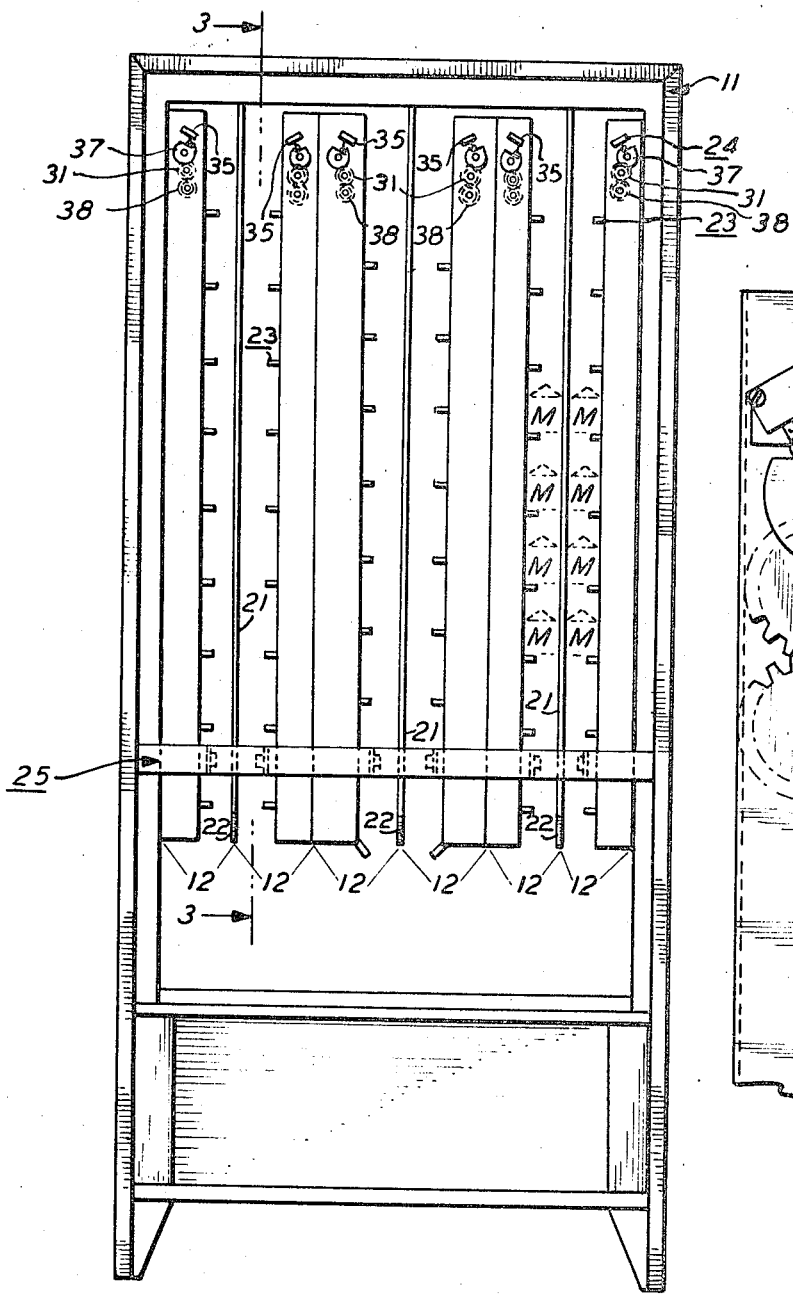
FIG. 1 is a front elevational view of a vending machine incorporating a plurality of vending units embodying the invention.

As will be seen from the drawings forming part hereof, this invention relates to an article dispensing machine operating, as will be described below, with reference generally to FIG. 9, so that the articles M (such as cartons) which are to be dispensed, are arranged in side-by-side relationship on the shelves. These shelves are then carried so that the articles on each shelf are selectively brought into contact with the automatic means for dispensing the articles serially from a particular shelf and then, as the machine is further operated, the operation is repeated for the successive shelf.

The machine 11 (FIG. 1) contains housing means 12, comprising a number of housing units, depending largely upon the width of the machine and the spacing of the housing units with respect to the size of articles to be dispensed. The various housing units may be of different types to dispense the same or different types of articles.

Each of the housing units 12 (FIG. 1) comprises an outer wall 21 with a cutoff lower edge 22 (FIGS. 1, 3 and 6) dispensing means 23, coin-actuated drive means 24, empty indicator means 25 and shelf carrying means 26.

Figure 2:
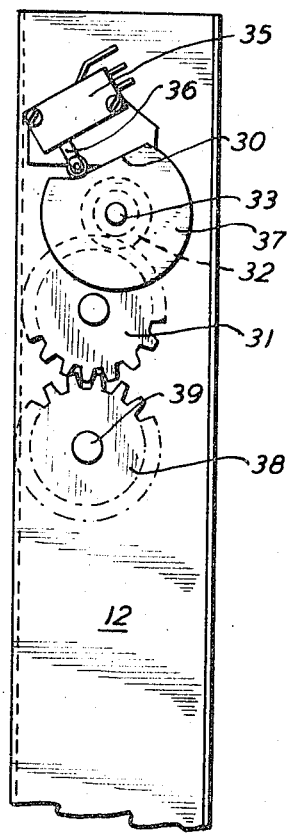
FIG. 2 is an end elevational view, taken on line 2–2 of FIG. 3.
Figure 10:
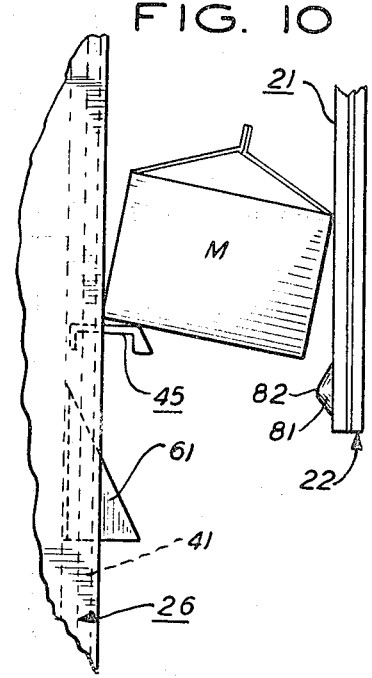
FIG. 10 is a fragmentary, schematic, view, showing the position of the parts just prior to the movement of a carton into registry with the protuberance for moving the same to discharge position.
Figure 11:
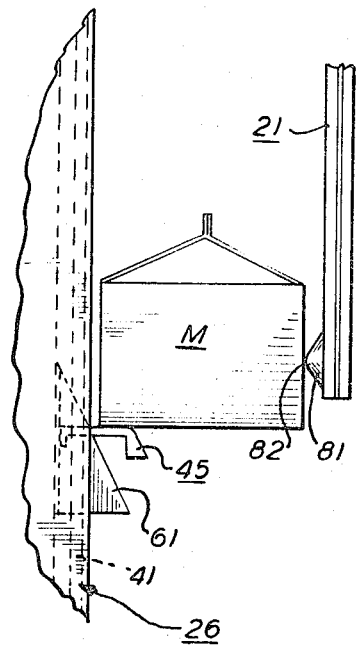
FIGS. 11 and 12 are similar views, showing the parts further advanced to discharge position.
Figure 12:
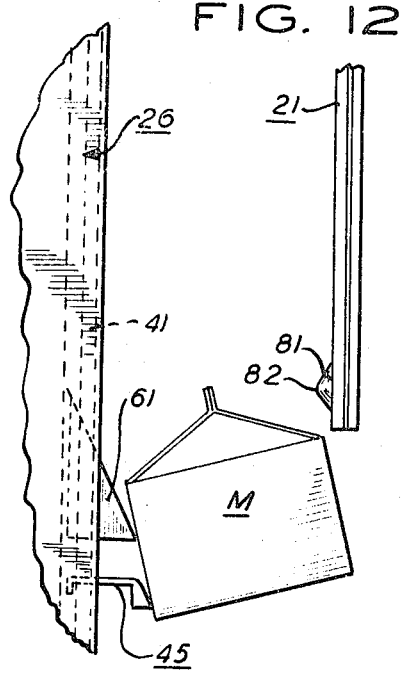
Figure 13:
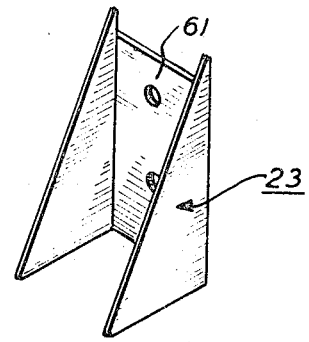
FIG. 13 is a front perspective elevational view of a protuberance pursuant to the invention.

The coin-actuated drive means 24 (FIGS. 1, 2 and 3) comprises, in one form of the invention, a recess 30, a gear 31 which is driven by the pinion 32, which in turn is keyed to the armature shaft 33 of the motor 34. The drive unit switch or solenoid 35 has connected thereto the cam follower 36 which is keyed to the surface of the motor-driven cam 37. The gear 31 drives the chain gear 38 which is keyed to the upper shaft 39 rotatably journaled in the dispensing means 23.

The shelf-carrying means 26 (FIGS. 3, 8 and 9) comprises chains 41 (FIG. 3) which are entrained on the upper sprockets 42 at their upper ends and on the lower sprockets 43 at their lower ends, the upper sprockets 42 being fixed to the upper shaft 39 and the lower sprockets 43 being fixed to the lower shaft 44, both shafts being journaled in the dispensing means 23.

The shelves 45 having cutout portions 52 therein (FIGS. 3, 8 and 9) are pivotally connected to the chains 41 by pivotal connectors 46. Each shelf 41, as seen in one embodiment of the invention in FIG. 9, is comprised of flat planar portions 47 having at the intermediate portions thereof an upwardly extending back wall 48 and at the forward portion thereof a forwardly and downwardly extending front flange 49. At the rear portion thereof is provided a downwardly projecting back flange 50. The forwardly projecting front flange 49 is weighted (FIGS. 8 and 9) such that the shelf 45 is urged backward and the downwardly projecting back flange 48 is thereby urged to contact and slide along the inner wall 62.

The dispensing means 23 consists of protuberances 61, inner wall 62, and deflection studs 81 with rounded points 82 thereon (FIGS. 3, 6—8 and 10—13). The protuberances 61 FIGS. 3 and 8—12) are mounted in a staggered relationship on the inner wall 62. They are shaped generally to extend downwardly and outwardly from the inner wall 62.

The empty indicator means 25 (FIGS. 4 and 5) is comprised of a fixed terminal 71, a movable terminal 72 and a movable arm 73 and spring means 74, the movable arm 73 extending behind and through the inner wall 62. The empty indicator means is electrically connected to an indicator device such that on complete dispensing of all articles M, the switch indicates the empty state on a conventional indicator light.

In operation (FIGS. 9—12) upon insertion of a coin, the coin-actuated drive means 24 (FIG. 3) operates to move the shelves 45 to the position where a single article can be dispensed. Upon actuation of the coin-actuated drive means 24 (FIG. 2) the cam follower 36 is pulled back into the drive unit from its rest position in the root of the recess 30 in the motor-driven cam 37. The motor 34 (FIG. 3), which is pulsed at the same instant as is the drive unit switch 35, causes the motor-driven cam 37 to rotate through drive of the armature shaft 33. As the motor-driven cam 37 moves, the cam follower 36 returns to the circumferential edge of the cam and the pinion 32 rotates, causing movement of the gear 31 which in turn rotates the chain gear 38. The chain gear 38 drives the upper sprockets 42 through movement of the upper shaft 39. The upper sprockets 42 cause the chains 41 to move and thereby rotates the lower sprockets 43 and the lower shaft 44. All motion continues until the cam follower 36 returns to the root of the recess 30 in the motor-driven cam 37, causing the circuit to open and all motion to stop. This cycle is set up such as to move the chains 41 and the shelves 45 connected thereto sufficiently to dispense only one article from the dispensing unit.

The shelves 45 are initially stocked with articles M in side-by-side relationship thereon (FIGS. 9—12), such articles situated between the back shelf wall 48, the flat shelf planar portions 47, and the outer wall 21. The shelves are maintained in proper position by the weighted front shelf flange 49 which urges the shelf back against the inner wall 62, and the back shelf flange 50 which extends down at right angles from the flat shelf planar portions to maintain an upright slide position. On the return (FIG. 8) behind the inner wall 62 the weighted front flange 49 and the pivotal connectors 46 maintain the shelves 45 in an angles position so that the area of space taken up on the return is small, making the dispensing means 23 (FIG. 1) compact, and permitting a large number of such units to be used in a machine 11. On downward movement of the shelves 45 (FIGS. 3, 10—12) dispensing occurs when a carton M after contacting deflection studs 81 with rounded points 82 (FIGS. 6 and 7) contacts a corresponding protuberance 61 and when further tipping occurs as the carton passes beneath the cutoff outer wall 22. The shelves 45 have cutout portions 52 (FIG. 9) thereon which permit movement of the shelf down and over the protuberances. The cutouts are of the particular shape in one embodiment of the invention which will permit the shelf to ride on the protuberance 61 (FIGS. 10—12) over a lower portion thereof, to then drop back to the inner wall such as to insure that the articles are moved clear of the shelves. Since the protuberances 61 (FIG. 13) are positioned on the inner wall 62 in staggered relationship and in a plane parallel to the plane of the cutoff lower edge 22 of the outer wall 13 (FIG. 3) only one article will be dispensed at each full cycle in the descent of the shelf until the entire shelf has been cleared and the next shelf has moved into a dispensing position and it too passes down and over the protuberances. when all articles have been dispensed from the machine the movable arm 73 of the empty indicator means 25, which is normally held in a position adjacent the inner wall 62 due to the weight of the cartons thereagainst (FIG. 9) will be permitted to swing forward, thereby moving the movable switch terminal 72 (FIGS. 4 and 5) out of contact with the fixed terminal 71, and causing activation through electrical connections of a conventional indicator light on the machine which indicates that all articles have been dispensed from the dispensing unit. The movable arm 73 of the empty indicator means 25 may be spring (as by spring means 74) or otherwise urged to attain the described action. Further, the parts may be so proportioned that the shelf 45 will contact the very lower end of the protuberance 61 so that the shelf will thereby be lifted or rotated slightly, thereby imparting a corresponding rotation to the carton M and aiding in the discharge thereof.

While the foregoing disclosure of exemplary embodiments is made in accordance with the patent statutes, it is to be understood that the invention is not to be limited thereto or thereby, the inventive scope being defined in the appended claims.

We claim:

1. In an article-dispensing machine for tilting and ejecting articles serially from shelves on which said articles are disposed:
   a planar inner wall adapted to be positioned in said machine;
   means for mounting a plurality of said shelves for movement along an axis of said planar wall;
   a planar outer wall in said machine adapted to be positioned in spaced relation to said inner wall;
   said outer wall having a lower edge provided with cutouts;
   said inner wall extending below said cutouts; and
   protuberances having no movable portions and being rigidly secured to and extending at all times from said inner wall in the path of movement of said cartons, said protuberances being juxtaposed relative to said cutouts so as to tilt and eject said articles below said cutouts on movement of the articles into engagement with said protuberances.

2. In an article-dispensing machine, for tilting and ejecting articles serially, as set forth in claim 1, said cutouts being disposed angularly relative to the axis of movement of said shelves.

3. In an article-dispensing machine, for tilting and ejecting articles serially, as set forth in claim 1: said cutouts being disposed in staggered relation to said axis of movement of said shelves; and
said protuberances being so disposed on said inner wall in correspondingly staggered relation.

4. In an article-dispensing machine, for tilting and ejecting articles serially as set forth in claim 1, said protuberances being so disposed on said inner wall in staggered relation to said axis of movement of said shelves.

5. In an article-dispensing machine, for tilting and ejecting articles serially as set forth in claim 1, said cutouts and said protuberances being disposed angularly relative to the axis of movement of said shelves.

6. In an article-dispensing machine, for tilting and ejecting articles serially as set forth in claim 1, said protuberances being tapered relative to said axis of movement of said shelves.

7. In an article-dispensing machine, for tilting and ejecting articles serially as set forth in claim 1, said protuberances being downwardly and outwardly tapered relative to said axis of movement of said shelves.

8. In an article-dispensing machine, for tilting and ejecting articles serially as set forth in claim 1, each of said protuberances comprising a triangular member.

9. In an article-dispensing machine, for tilting and ejecting articles serially as set forth in claim 1, each of said protuberances comprising a pair of triangular members.

10. In an article-dispensing machine, for tilting and ejecting articles serially as set forth in claim 1, each of said protuberances comprising a pair of substantially spaced triangular members.

11. In an article-dispensing machine, for tilting and ejecting articles serially as set forth in claim 1, each of said shelves having a back flange for sliding engagement with said inner wall and a front flange disposed substantially forwardly of the back flange and downwardly angularly disposed so as to cooperate with the protuberance in tilting the article as it moves below said cutouts.

12. In an article-dispensing machine, for tilting and ejecting articles serially as set forth in claim 1, deflection studs juxtaposed on said outer wall in relation to said protuberances so as to cooperate with said protuberances in the tilting of said articles into engagement with said protuberances as said articles move past said lower edge of the outer wall.

13. In an article-dispensing machine, for tilting and ejecting articles serially as set forth in claim 1, deflection studs juxtaposed on said outer wall adjacent the cutouts therein and in relation to said protuberances so as to cooperate with said protuberances in the tilting of said articles into engagement with said protuberances as said articles move past said lower edge of the outer wall.

14. In an article-dispensing machine, for tilting and ejecting articles serially as set forth in claim 1, deflection studs juxtaposed on said outer wall adjacent the cutouts therein and in relation to said protuberances so as to cooperate with said protuberances in the tilting of said articles into engagement with said protuberances as said articles move past said lower edge of the outer wall, said deflection studs having rounded points.

15. In an article-dispensing machine as described in claim 1, said shelves being provided with openings axially aligned with the positions of said protuberances on said inner wall, such as to permit said shelves to move down and over said protuberances without contact therewith on said axial movement of said shelves.

16 In an article-dispensing machine as described in claim 1, each of said shelves having a continuous forward portion thereof directed downwardly and forwardly, and having flat planar portions extending rearwardly therefrom in spaced relation to define slots intermediate the planar portions to receive and pass over said protuberances.